United States Patent [19]
Potnis et al.

[11] Patent Number: 6,138,470
[45] Date of Patent: Oct. 31, 2000

[54] PORTABLE LIQUID DESICCANT DEHUMIDIFIER

[75] Inventors: Shailesh V. Potnis, Plainsboro, N.J.; Srikant Ram Rao, Newtown, Pa.; Robert L. Laurent, Jr., Martinsville, N.J.

[73] Assignee: Fedders Corporation, Liberty Corner, N.J.

[21] Appl. No.: 08/984,741

[22] Filed: Dec. 4, 1997

[51] Int. Cl.[7] .............................. F25D 23/00; F25D 17/06; G21B 43/00; E21B 27/00
[52] U.S. Cl. ................................ 62/271; 62/94; 165/154; 165/158; 165/163
[58] Field of Search ........................ 62/271, 94; 165/163, 165/168, 169, 154, 177, 166, 167, 158

[56] References Cited

U.S. PATENT DOCUMENTS

| | | |
|---|---|---|
| 1,132,194 | 3/1915 | Leaó . |
| 2,143,008 | 1/1939 | Heath et al. ............................. 252/2.5 |
| 2,993,563 | 7/1961 | Munters et al. ........................ 183/4.6 |
| 3,733,791 | 5/1973 | Dravnieks ................................ 55/390 |
| 3,850,227 | 11/1974 | Ford . |
| 3,975,229 | 8/1976 | Jackson ................................... 159/31 |
| 4,139,054 | 2/1979 | Anderson ................................ 165/76 |
| 4,461,347 | 7/1984 | Layton et al. ........................... 165/133 |
| 4,594,860 | 6/1986 | Coellner et al. ........................ 62/271 |
| 4,898,233 | 2/1990 | Grehier et al. ......................... 165/166 |
| 4,915,715 | 4/1990 | Oshima et al. .......................... 55/208 |
| 4,939,906 | 7/1990 | Spatz et al. .............................. 62/94 |
| 5,097,668 | 3/1992 | Albers et al. ............................. 62/94 |
| 5,123,481 | 6/1992 | Albers et al. ........................... 165/111 |
| 5,129,925 | 7/1992 | Marsala et al. .......................... 55/164 |
| 5,213,154 | 5/1993 | Marsala et al. ......................... 165/115 |
| 5,297,398 | 3/1994 | Meckler .................................... 62/271 |
| 5,534,186 | 7/1996 | Walker et al. ........................... 252/194 |
| 5,542,467 | 8/1996 | Carpentier ................................ 165/70 |
| 5,729,999 | 3/1998 | Kuhlenschmidt et al. . |

OTHER PUBLICATIONS

Frank Incropera and David DeWitt, Introduction to Heat Transfer, John Wiley & Sons, ISBN 0–471–30458–1, p. 544, 1996.

*Primary Examiner*—William Doerrler
*Assistant Examiner*—Chen-Wen Jiang
*Attorney, Agent, or Firm*—Welsh & Katz, Ltd.

[57] ABSTRACT

A liquid desiccant dehumidifier includes a liquid desiccant absorber arranged to receive concentrated liquid desiccant and absorb moisture contained in ambient air passed through the absorber thereby diluting the liquid desiccant. A first heat exchanger is operative to heat dilute liquid desiccant received from the desiccant absorber prior to passage to a boiler that evaporates moisture from the diluted liquid desiccant to create steam and reconstitute the desiccant into a concentrated liquid desiccant. Dilute liquid desiccant from the first heat exchanger first passes to a condenser that receives steam from the boiler and sensibly heats the dilute liquid desiccant to a higher second temperature without direct exposure to steam or air. A second heat exchanger communicates with the condenser, the boiler and the first heat exchanger and is operative to further heat diluted liquid desiccant received from the condenser to a higher third temperature prior to entry into the boiler by recovering waste heat from the boiler. A pump draws concentrated liquid desiccant from the boiler through the heat exchangers and passes it to the absorber.

62 Claims, 8 Drawing Sheets

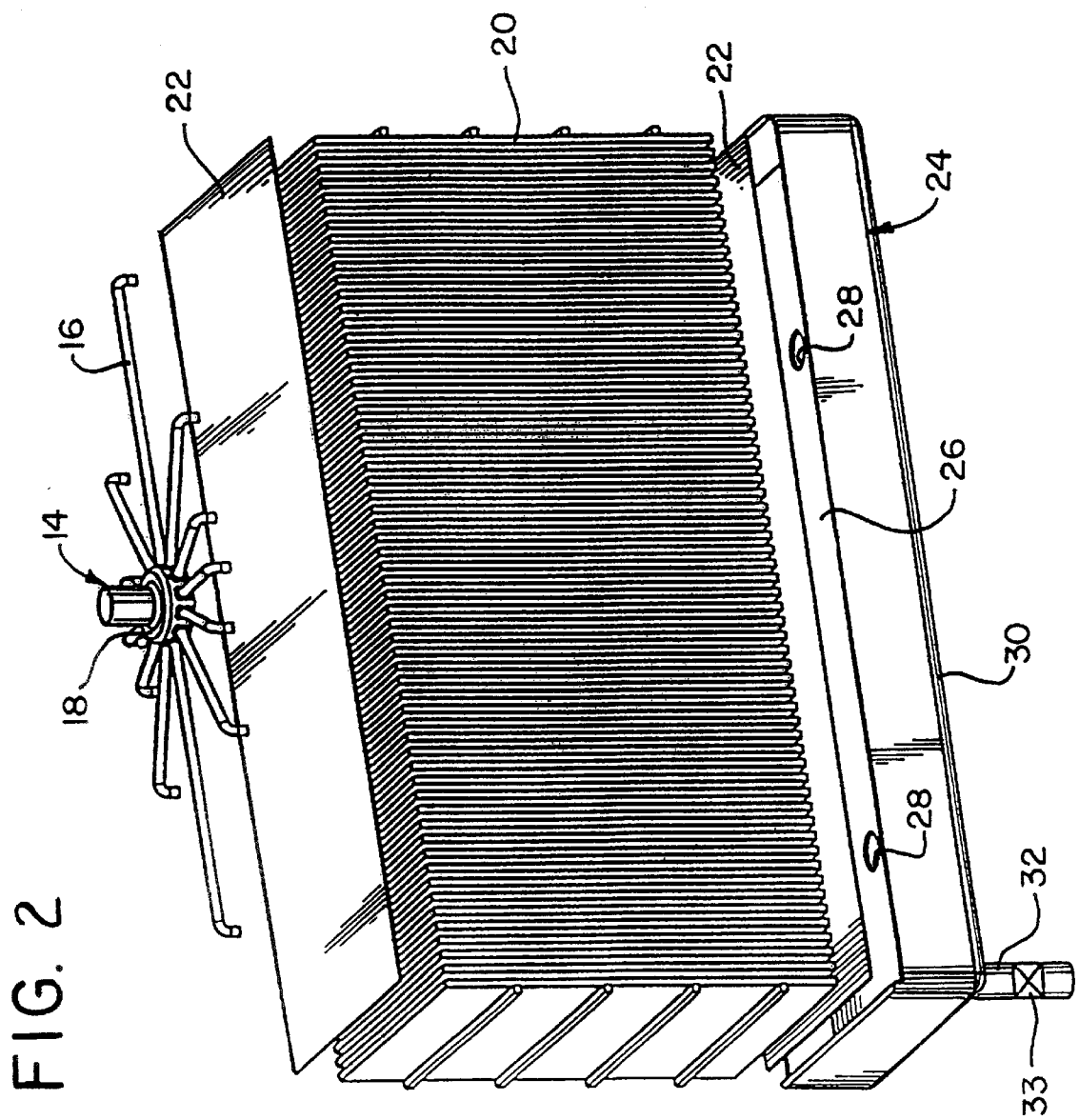

PORTABLE LIQUID DESICCANT DEHUMIDIFIER

BACKGROUND

1. Field of the Invention

The present invention relates generally to room air dehumidification, and more particularly, to a liquid desiccant dehumidifier which is portable, energy efficient, and corrosion resistant.

2. Description of the Prior Art

It is known in the art to dehumidify ambient air using liquid desiccant systems. These devices typically utilize hygroscopic liquids such as lithium bromide (LiBr), lithium chloride (LiCl) or calcium chloride ($CaCl_2$) as the desiccant solution. Desiccant units offer advantages over commercial dehumidifiers based on vapor compression technology, specifically in terms of lower energy usage.

In a desiccant system, the desiccant solution absorbs moisture from ambient air exposed to the solution. As the desiccant solution continues to absorb moisture, it becomes dilute and must be regenerated. In the regeneration process, the desiccant solution is heated to evaporate the excess moisture or the desiccant solution is brought into contact with a hot gas to desorb the excess moisture. In some expedients, air regenerators are used to regenerate the desiccant. These arrangements have relatively high operating costs as energy is required to provide a source of heat and to generate a suitable flow of air. In others, boiler-type regenerators are employed. However, boiler embodiments are expensive, as the corrosive nature of liquid desiccant solutions necessitates the use of costly corrosion resistant metals.

A liquid desiccant dehumidfication system in which a liquid desiccant is regenerated with a boiler is described in U.S. Pat. No. 4,939,906 ("the '906 patent"). The '906 patent discloses a gas-fired desiccant boiler and a combined desiccant regenerator/interchange heat exchanger, in which the combined regenerator/heat exchanger utilizes steam produced from the boiler to provide heat for partial regeneration. The desiccant boiler has a liquid/vapor separator chamber and thermosyphon recirculation to reduce scale and corrosion of the boiler. Specifically, the overall system is shown in FIG. 1, wherein outdoor air is drawn into the system through an inlet duct 22, and is evaporatively cooled by a water spray 24. The cooled air is directed to a desiccant conditioner 26 to which return air is also directed through a duct 30. In the desiccant conditioner 26, the return air is contacted with a liquid desiccant solution from a sprayer 28. The desiccant liquid is disclosed as lithium calcium chloride.

This dehumidified air is then supplied to the space to be dehumidified, or it can be sensibly cooled through an evaporative cooler 32. The desiccant dehumidifies the air stream, and in the process its moisture-absorbing capability is reduced; this capability is regenerated by passing a portion of the dilute desiccant from the conditioner 26 to a first interchange heat exchanger 44, wherein the temperature of the desiccant is raised. The weakened desiccant is partially concentrated in an air-desiccant regenerator 46, in which heated air from a regeneration air heater 48 contacts the liquid desiccant. This desiccant is pumped through a second interchange heat exchanger 52 and thereafter to a desiccant boiler 56, in which regeneration of the desiccant is completed. The water vapor generated in the desiccant boiler 56 raises the temperature of the air passing through the regeneration air preheater 48. The interchange heat exchangers 44, 52 reduce the temperature of the regenerated desiccant as it returns along the pipe 60 to the conditioner 26.

The boiler 56 is depicted in FIG. 2, and operates on natural circulation, with the density of the fluid (part liquid, part vapor) in the "fired" tubes 70 being less than the density of the liquid in the outer "unfired" tube 74. A porous ceramic burner 80 facilitates combustion to provide a heat source and hot combustion gases are blown through a combustion chamber formed by a housing 88 enclosing the fired tubes 70, and flow across fins 90 of the fired tubes 70. Weak desiccant is pumped into the fired tubes 70 through a manifold 94 which causes water in the desiccant to be vaporized. Accordingly, a density differential is created between the fluid in the fired tubes 70 and the unfired tubes 74 connected between the manifold 94 and a liquid/vapor separator 98 outside the combustion chamber housing 88. This density differential induces a natural flow of desiccant solution up the fired tubes 70 and down the unfired tubes 72. In this manner, the natural circulation of desiccant keeps the inside walls of the fired tubes 70 coated with desiccant to thereby reduce or prevent "hot spots" from forming on the inside of the fired tubes 70 to reduce corrosion and scale build up in the fired tubes 70.

The liquid vapor separator 98 at the top of the boiler 56 separates water vapor from the concentrated liquid desiccant. A portion of the concentrated desiccant is withdrawn from the bottom of the liquid/vapor separator 98 and is returned to the desiccant conditioner 26. Water vapor flowing out of the top of the liquid/vapor separator 98 is subsequently condensed to heat air for use in an earlier regeneration step shown in FIGS. 3 and 4.

The combined regenerator/interchange heat exchanger, depicted in FIGS. 3 and 4, comprises two (2) interchange heat exchangers 44, 52, the desiccant regenerator 46 and the regeneration air heater 48. The combined desiccant regenerator/interchange heat exchanger is identified by the reference numeral 102, and is constructed by alternately stacking two (2) different corrugated plates (see FIG. 4) to define alternating flow channels. Water vapor or steam from the desiccant boiler 56 is introduced near the top of the regenerator/exchanger 102 in alternate channels (plate A). This water vapor is condensed, thereby transferring heat to the air and weak desiccant entering adjacent channels near the top of the regenerator/heat exchanger 102 (plate B). The upper portion of each plate corresponds to the desiccant regenerator 46 and regeneration air heater 48. As the water vapor condenses, the weak desiccant and air mixture is heated and the desiccant is partially regenerated. Warm air and moisture are exhausted by fan 106 to the outdoors. An entrainer 108 is provided to prevent desiccant from escaping the combined regenerator/exchanger 102. The partially regenerated desiccant flows into the middle of a channel plate B, and is further heated by the hot concentrated desiccant removed from the liquid/vapor separator 98. Hot concentrated desiccant from the boiler 56 is introduced at the middle of plate A while the partially regenerated desiccant is removed from the middle of plate B. The partially regenerated desiccant is then pumped to the desiccant boiler 56. Diluted desiccant from the regenerator/heat exchanger 102 is introduced at the bottom of the plate A and is heated by the hot desiccant from the boiler 56. The heated dilute desiccant from the regenerator/heat exchanger 102 is then removed from the center of plate B and pumped to the top of plate B.

The apparatus shown and described in the '906 patent suffers from several disadvantages. The regeneration process described therein requires the flow of hot air through the system in order to operate. This necessitates the use of additional components such as fans, air preheaters, and liquid/vapor separators, which adds system complexity. Furthermore, the multiple stacked plate interchange heat exchanger configuration is complex and takes up a relatively large amount of space. This arrangement is not suitable for use in a small portable unit.

SUMMARY OF THE INVENTION

In view of the disadvantages in the prior art, it is an object of the present invention to provide a portable liquid desiccant dehumidifier which efficiently regenerates the liquid desiccant using a simple arrangement having a minimum number of components.

It is another object of the present invention to provide a portable liquid desiccant dehumidifier which is energy efficient.

It is still another object of the present invention to provide a portable liquid desiccant dehumidifier which utilizes primarily plastic components to prevent corrosion.

It is yet another object of the present invention to provide a portable liquid desiccant dehumidifier in which steam to desiccant heat recovery takes place in a condenser.

It is a further object of the present invention to provide a portable liquid desiccant dehumidifier in which plastic components are used for the interchange heat exchangers.

It is yet another object of the present invention to provide a portable liquid desiccant dehumidifier in which the waste heat radiating from the boiler is utilized in an interchange heat exchanger for desiccant regeneration.

It is still another object of the present invention to provide a portable liquid desiccant dehumidifier having a boiler which is primarily elongated in a horizontal orientation to minimize the temperature gradient and consequent concentration differential in the liquid desiccant.

It is yet another object of the present invention to provide a portable liquid desiccant dehumidifier which is lightweight, energy efficient, and inexpensive to manufacture.

It is a further object of the present invention to provide an improved heat exchanger employing at least one TEFLON tube concentrically disposed within a silicone rubber tube.

In accordance with the foregoing objects and additional objects that will become apparent hereinafter, the present invention provides a liquid desiccant dehumidifier, including a liquid desiccant absorber for absorbing moisture contained in ambient air entering the dehumidifier and passing through the desiccant absorber, the desiccant absorber constructed and arranged for receiving concentrated liquid desiccant and dispensing dilute liquid desiccant. A boiler is provided for boiling partially preheated dilute liquid desiccant to evaporate moisture to reconstitute the liquid desiccant into concentrated liquid desiccant. A condenser fluidly communicates with the boiler to receive steam generated by boiling liquid desiccant in the boiler, and with the absorber to receive dilute liquid desiccant from the absorber. The condenser is operable to sensibly heat the dilute liquid desiccant therein by recovering the latent heat of condensation as steam delivered from the boiler is condensed, to preheat the dilute liquid desiccant prior to delivery to the boiler to increase operating efficiency.

In a preferred embodiment, the invention provides a liquid desiccant dehumidifier including a liquid desiccant absorber for absorbing moisture contained in ambient air entering the dehumidifier and passing through the desiccant absorber, the desiccant absorber constructed and arranged for receiving concentrated liquid desiccant and dispensing dilute liquid desiccant. A boiler is provided for boiling partially preheated dilute liquid desiccant to evaporate moisture to reconstitute the liquid desiccant into concentrated liquid desiccant. A first heat exchanger fluidly communicates with the desiccant absorber and a second heat exchanger. The first heat exchanger is operable to transfer heat from the concentrated liquid desiccant to the dilute liquid desiccant directed to the first heat exchanger from the desiccant absorber to raise the temperature of the dilute liquid desiccant to a first temperature. A condenser fluidly communicates with the boiler to receive steam generated by boiling the liquid desiccant in the boiler, and with the first heat exchanger to receive partially heated dilute liquid desiccant from the first heat exchanger at the first temperature. The condenser is operable to sensibly heat the dilute liquid desiccant therein to a second temperature by recovering the latent heat of condensation as steam delivered from the boiler is condensed. The second heat exchanger fluidly communicates with the condenser, the boiler and the first heat exchanger. The second heat exchanger is operable to transfer heat from concentrated liquid desiccant directed to the second heat exchanger from the boiler to the dilute liquid desiccant directed to the second heat exchanger from the condenser at the second temperature to raise the temperature of the dilute liquid desiccant to a third temperature. The dilute liquid desiccant at the third temperature is directed to the boiler and the concentrated liquid desiccant from the second heat exchanger is directed to the first heat exchanger. The second heat exchanger is disposed with respect to the boiler to recover waste heat from the boiler. A pump is provided for pumping concentrated liquid desiccant into the absorber.

In a preferred embodiment, the desiccant absorber includes a top and a bottom and comprises: a plurality of horizontally and vertically disposed interconnected microglass fiber plates; a distributor disposed above the fiber plates at the top of the desiccant absorber for introducing the concentrated desiccant into the desiccant absorber; and a drain pan for collecting the dilute desiccant disposed at the bottom of the desiccant absorber.

The first heat exchanger comprises at least one tube assembly including an inner tube concentrically disposed within an outer tube to define an annulus therebetween. The dilute liquid desiccant from the desiccant absorber is passed through the inner tube, and the concentrated liquid desiccant is passed through the annulus, or vice-a-versa.

The second heat exchanger comprises at least one tube assembly including an inner tube concentrically disposed within an outer tube to define an annulus therebetween. The tube assembly is coiled around the boiler to recover waste heat passing through the walls of the boiler. The concentrated liquid desiccant from the boiler is passed through the annulus and the partially heated dilute liquid desiccant from the condenser is passed through the inner tube, or vice-a-versa.

In a preferred embodiment, the inner tubes of the heat exchangers are fabricated from TEFLON and the outer tubes are fabricated from silicone rubber. The inner tubes may be convoluted or corrugated to increase the available heat transfer area.

In a preferred embodiment, the condenser comprises an inner shell disposed within an outer housing defining at least one chamber between the inner shell and the housing. Steam is directed to the inner shell from the boiler through a steam inlet. The housing includes a solution inlet to direct partially heated dilute liquid desiccant from the first heat exchanger into the at least one chamber. A solution outlet communicates with the chamber and directs partially heated dilute desiccant at the second temperature to the second heat exchanger. The inner shell is fabricated from materials including inconel, monel, titanium, TEFLON, TEFLON-coated copper, TEFLON-coated aluminum, and TEFLON-coated stainless steel; and the outer shell is fabricated from materials including TEFLON, polycarbonate, polyvinylidene fluoride, polypropylene, silicone rubber, polyethylene, and polystyrene.

In an alternative embodiment, the condenser comprises at least one steam inlet communicating steam from the boiler with the at least one chamber and at least one solution inlet communicating partially heated dilute liquid desiccant from the first heat exchanger with the inner shell.

The condenser may incorporate a plurality of fins associated with the inner shell and a plurality of fins associated with the housing. The inner shell may be provided with a plurality of baffles to prevent short circuiting from the steam inlet to the condensate outlet.

In another embodiment, the condenser comprises a housing and a plurality of convoluted tubes. The tubes are supported by opposing support plates, and communicate with a steam inlet to receive steam from the boiler. The housing includes a solution inlet to receive partially heated dilute liquid desiccant from the first heat exchanger, and a solution outlet through which partially heated dilute liquid desiccant is delivered to the second heat exchanger. The tubes are fabricated from Teflon, and the support plates include at least one silicone rubber sheet attached thereto.

In a preferred embodiment, the respective components are disposed with respect to one another to take advantage of gravity feed to communicate the liquid desiccant from the absorber to the boiler via the first and second heat exchangers and the condenser, thereby eliminating the need for multiple pumps in the system.

BRIEF DESCRIPTION OF THE DRAWINGS

In accordance with the above, the present invention will now be described in detail with particular reference to the accompanying drawings.

FIG. 2 is an exploded isometric view of a desiccant absorber assembly;

FIG. 2A is a detail view of the microglass fiber plates in the absorber;

DETAILED DESCRIPTION OF THE PREFERRED EMBODIMENTS

Figure 1:
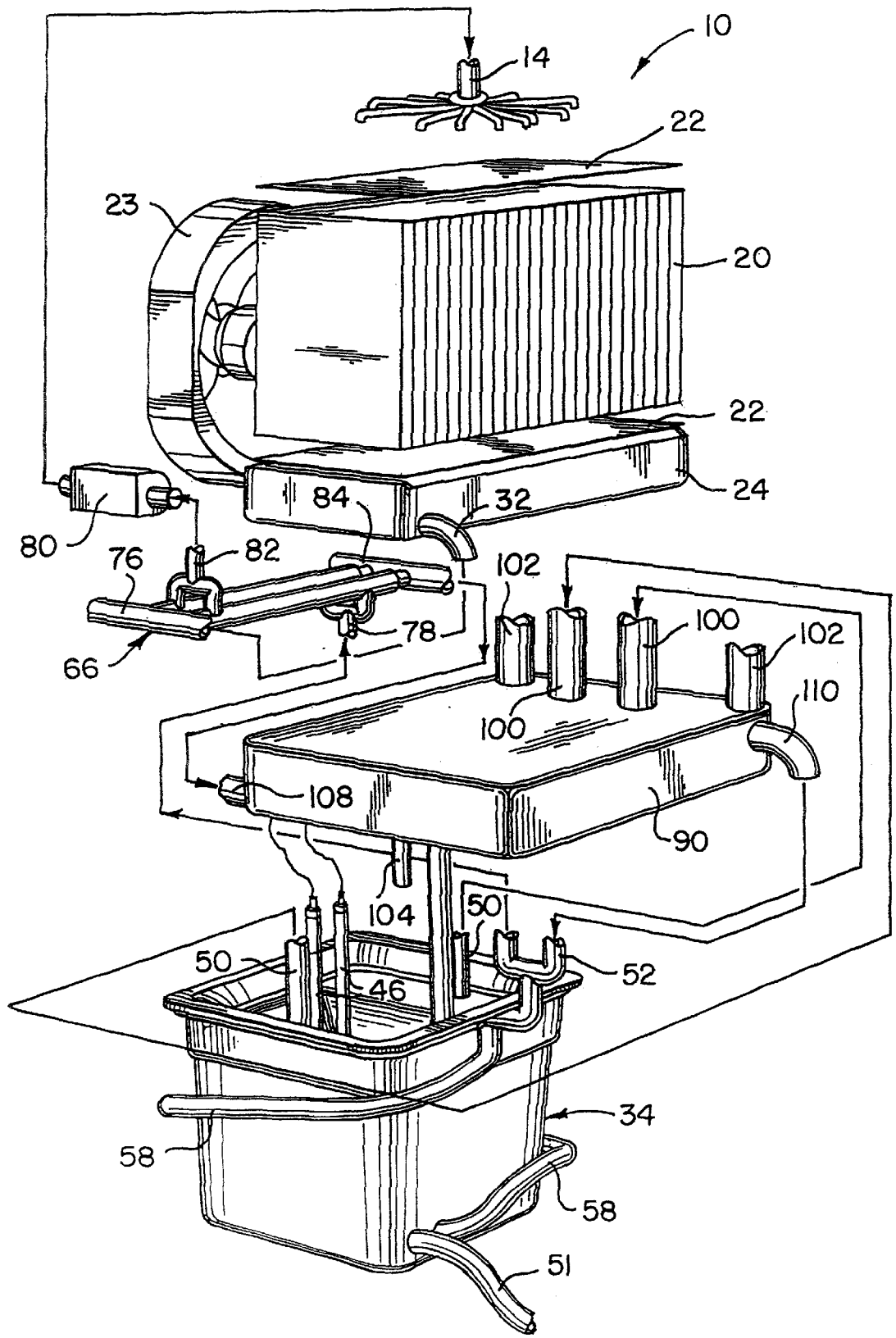
FIG. 1 is an exploded isometric view of the portable liquid desiccant dehumidifier in accordance with the present invention.

Referring to the several views of the drawings, there is shown a portable liquid desiccant dehumidifier ("PLDD"), generally characterized by the reference numeral 10.

Figure 1A:
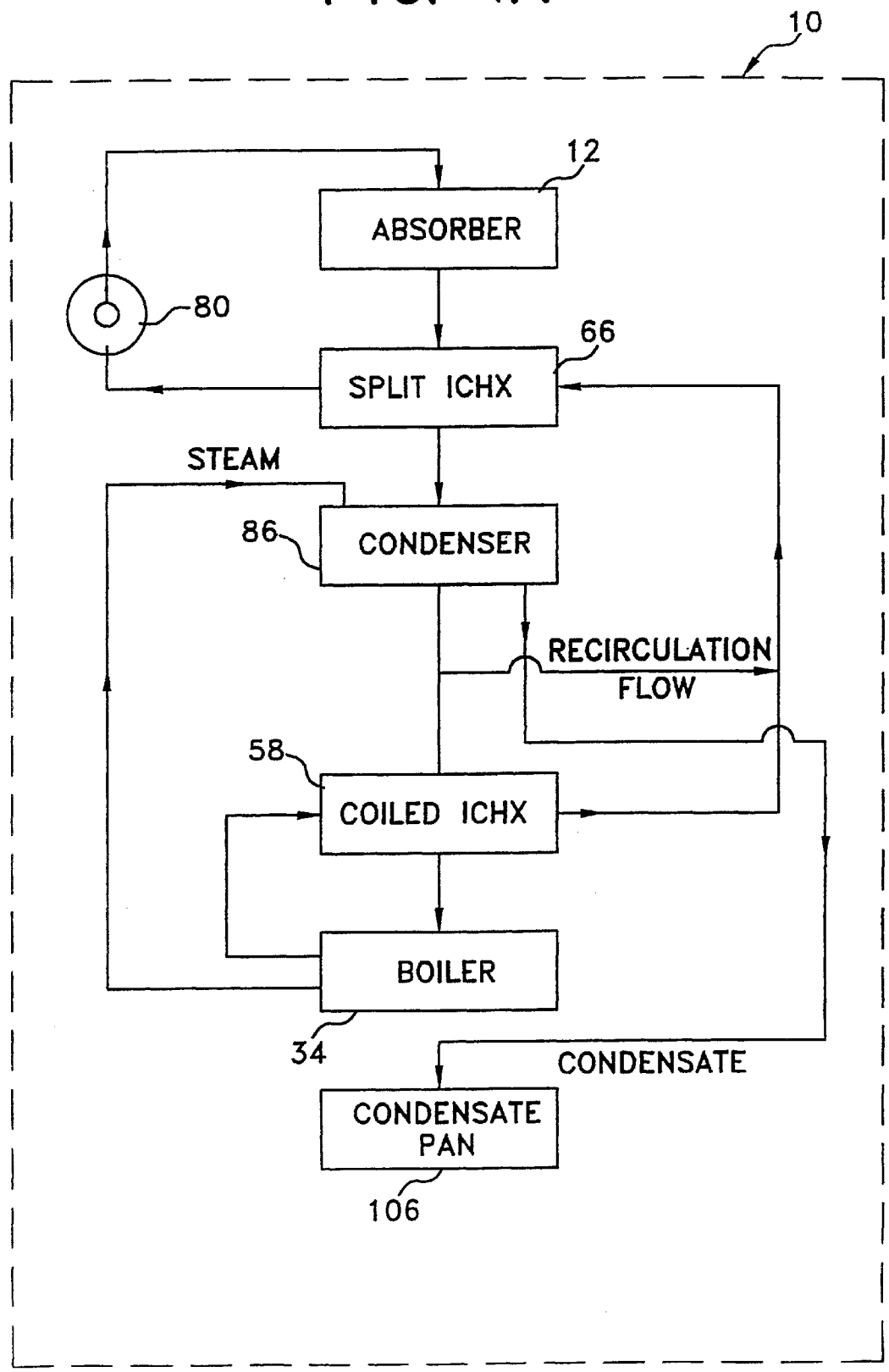
FIG. 1A is a block diagram depicting the general operation of the invention.
Figure 10:
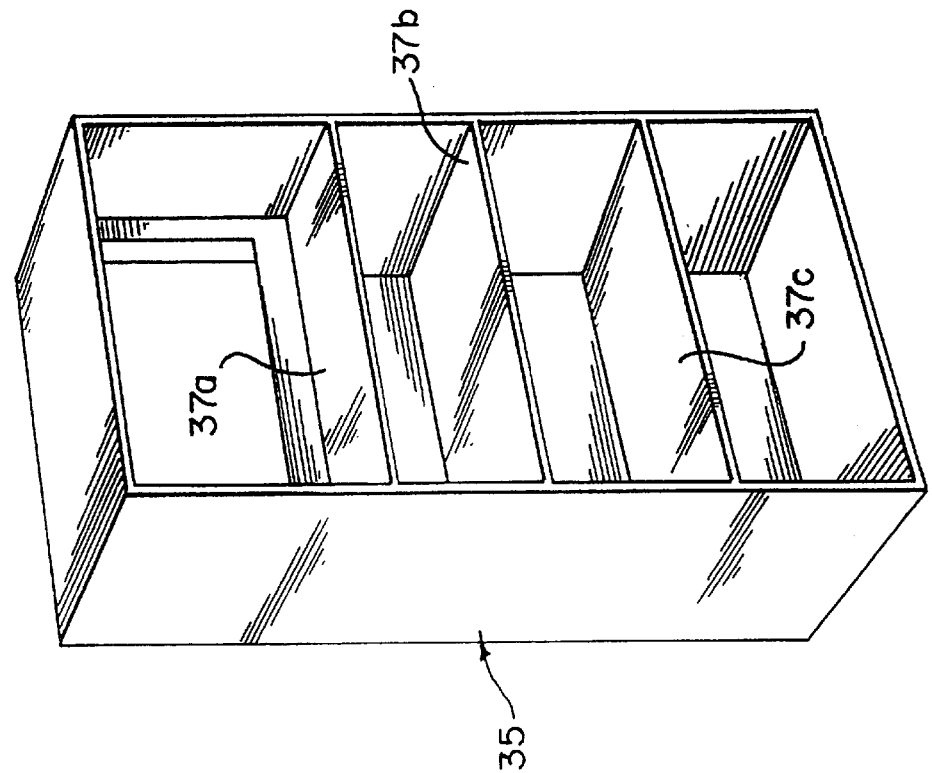
FIG. 10 is an isometric cut-away view of a frame for housing the respective components of the system.

Referring now to FIGS. 1 and 1A, the PLDD 10 includes a liquid desiccant absorber 12 for absorbing moisture contained in ambient air entering dehumidifier 10 and passing through desiccant absorber 12. The desiccant absorber 12 is constructed and arranged for receiving concentrated liquid desiccant at the top of desiccant absorber 12 and dispensing dilute liquid desiccant from the bottom of desiccant absorber 12. The desiccant solution may be any one of several conventional solutions, including aqueous LiBr, LiCl or $CaCl_2$, as described above, or any mixture of these solutions. Referring now to FIGS. 2 and 2A, desiccant absorber 12 includes a distributor 14 disposed at the top of desiccant absorber 12 which receives concentrated liquid desiccant and delivers the liquid desiccant through a plurality of "spaghetti" tubes 16 extending radially outward from a central hub 18. The desiccant absorber 12 includes a plurality of horizontally and vertically disposed interconnected microglass fiber plates. The vertical plates are identified by the reference numeral 20, and are supported by horizontal interconnecting fiber plates 22 as shown. The top plate 22 is referred to as a distribution sheet. The concentrated desiccant wicks into the distribution sheet 22 and down the vertical plates 20. The vertical plates 20 contain beads 21 which separate and support contiguous vertical plates 20. Ambient air is drawn into the unit and forced through the microglass fiber plates by a fan 23 (see FIG. 1), where the moisture in the air is removed as the air makes contact with the liquid desiccant. As the desiccant dehumidifies the air stream, the moisture-absorbing capability of the desiccant is reduced and the desiccant must be regenerated. This dilute desiccant is collected in a drain pan 24 disposed at the bottom of desiccant absorber 12. The drain pan 24 includes an intermediate support plate 26 defining at least one drain hole 28 which enables the dilute desiccant to flow into a bottom chamber defined between support plate 26 and a bottom wall 30 of drain pan 24. A drain tube 32 including a one-way or check valve 33 extends from the bottom chamber to direct the dilute desiccant out of absorber 12. The absorber components are disposed within a frame 35 as shown in FIG. 10, which can be fabricated from materials including, but not limited to, polypropylene, polyethylene, polytetrafluoroethyline, referred to herein under the trademark TEFLON, polyvinylidene fluoride, polycarbonate, PVC or polystyrene. The frame 35 includes a plurality of shelves 37a, 37b, and 37c for supporting the respective components of the unit described below.

The dilute liquid desiccant is regenerated into concentrated desiccant by boiling the liquid desiccant in a boiler 34 at a temperature in the range of from approximately 260° F. to 320° F. An improvement over prior art systems resides in the use of steam from desiccant regeneration to sensibly preheat the dilute liquid desiccant. The dilute liquid desiccant is passed through a condenser and preheated using the latent heat of condensation of the steam produced by boiling the liquid desiccant. Preferably, a series of interchange heat exchangers are employed to further preheat the dilute liquid desiccant entering the boiler 34 by recovering heat from the concentrated liquid desiccant delivered to absorber 12 from boiler 34 to further increase operating efficiency. These components are described in more detail below.

Figure 3:
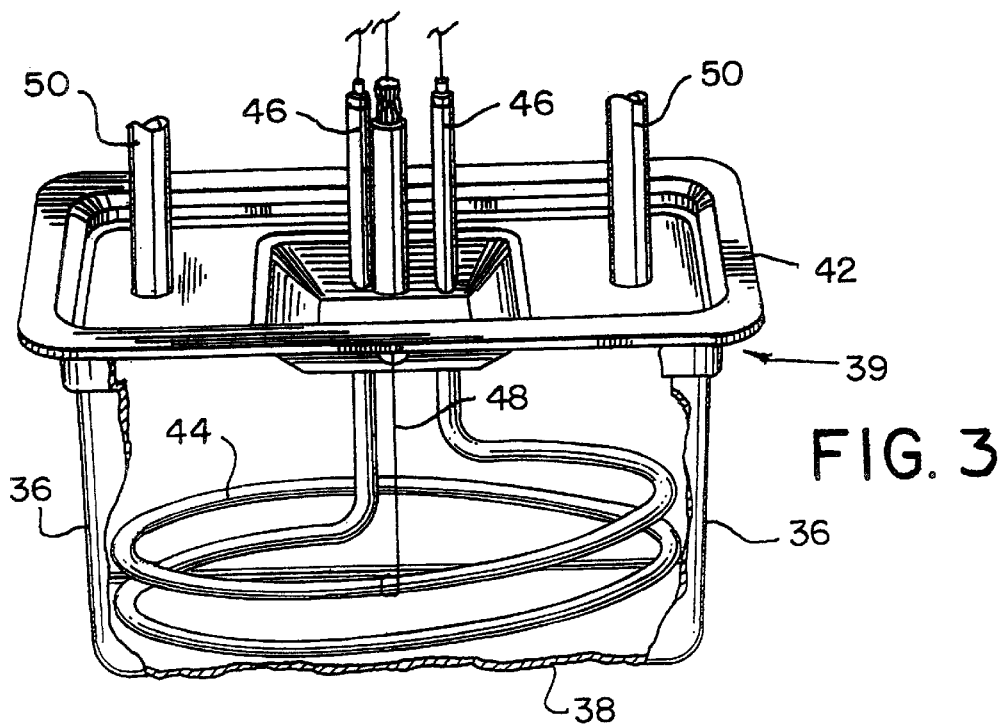
FIG. 3 is an isometric view of a boiler.

The boiler 34 is shown in FIG. 3, and is configured in the shape of a tub or vessel having an elongated horizontal dimension. The horizontal elongation provides a uniform temperature gradient, and thus a uniform concentration level of the liquid desiccant solution, as compared to a vertically elongated boiler. The boiler 34 includes side walls 36, a bottom wall 38, a top wall 40, and a peripheral support flange 42 for supporting the other dehumidifier components above the boiler. The boiler 34 is constructed from materials including, but not limited to, polycarbonate, polyvinylidene fluoride, TEFLON and the like. A heating element 44 is coiled proximal to the bottom wall 40 as shown, and is connected to a pair of leads 46 in a conventional manner. A thermocouple 48 extends into boiler 34 to monitor the internal temperature. The leads 46 and thermocouple 48 extend through top wall 40. The heating element 44 and thermocouple 48 are operably associated with a controller (not shown) for maintaining boiler 34 at the optimum temperature. A pair of steam outlets 50 extend through top wall 40 to deliver steam generated by boiling the liquid desiccant to a condenser described in more detail below.

Figure 4:
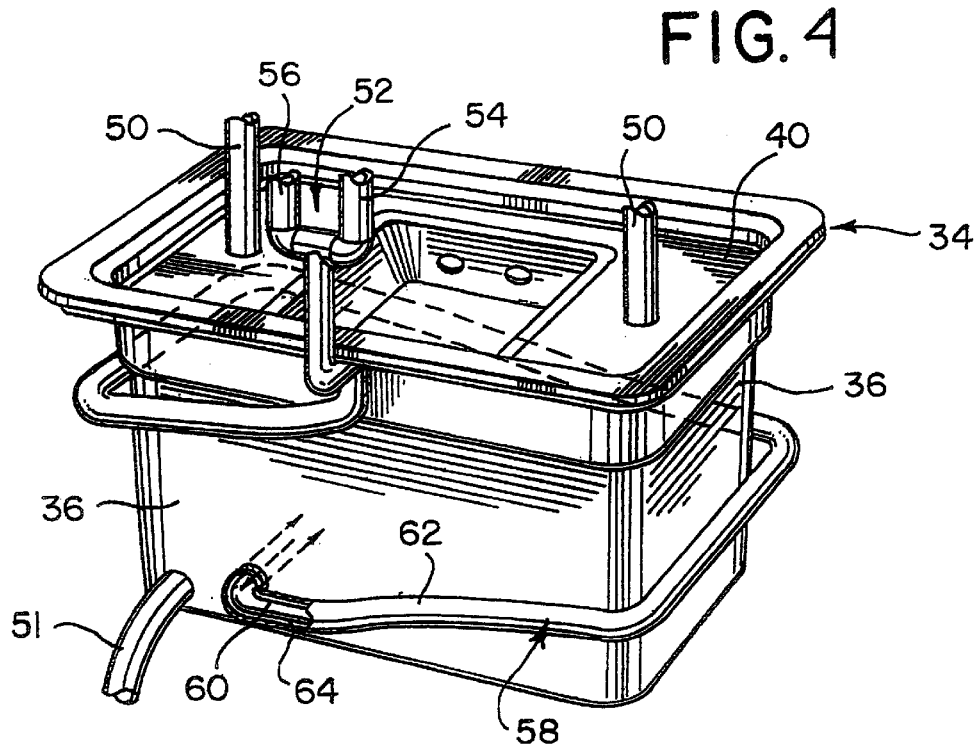
FIG. 4 is a an isometric view of a coiled interchange heat exchanger and the boiler.

Referring now to FIG. 4, a drain tube 51 is coupled to one of the side walls 36 to enable boiler 34 to be emptied as required. A U-fitting 52 is coupled to the upper region of one of the side walls 36 to receive preheated dilute liquid desiccant from the condenser through an inlet port 54, and to dispense concentrated liquid desiccant through an outlet port 56. The U-fitting 52 communicates with a coiled interchange heat exchanger 58, which comprises at least one tube assembly including an inner tube 60 concentrically disposed within an outer tube 62 to define an annulus 64 therebetween. The tube assembly is coiled around boiler 34 to recover the waste heat radiating through side walls 36. This arrangement is exemplary, as the tube assembly could be embedded within the side walls 36, or disposed in contact with top wall 40. The concentrated liquid desiccant from boiler 34 enters the annulus 64 through side wall 36 and is directed to outlet port 56. The partially heated dilute liquid desiccant from the condenser is passed through the inner tube 60 in a direction counter to the concentrated liquid desiccant and enters boiler 34 through side wall 36. Alternatively, the concentrated liquid desiccant is passed through inner tube 60 and the dilute liquid desiccant is passed through annulus 64. In a preferred embodiment, inner tube 60 is fabricated from TEFLON, and outer tube 62 is constructed from silicone rubber. The TEFLON inner tube 60 has relatively high heat conductivity, while the outer silicone rubber tube 62 has a relatively low thermal conductivity, and is a good insulator. These components can withstand relatively high temperatures (~400° F.), and are not corroded by the desiccant solution. To improve efficiency, inner tube 60 may be convoluted as shown in FIG. 5A or corrugated as shown in FIG. 5B. It is to be understood that the use of this type of TEFLON/silicone rubber tube-in-tube heat exchanger is not limited to a liquid desiccant system. There are many applications in which this arrangement may be employed. The particular operation of the coiled interchange heat exchanger 58 will be described in more detail below.

Figure 5:
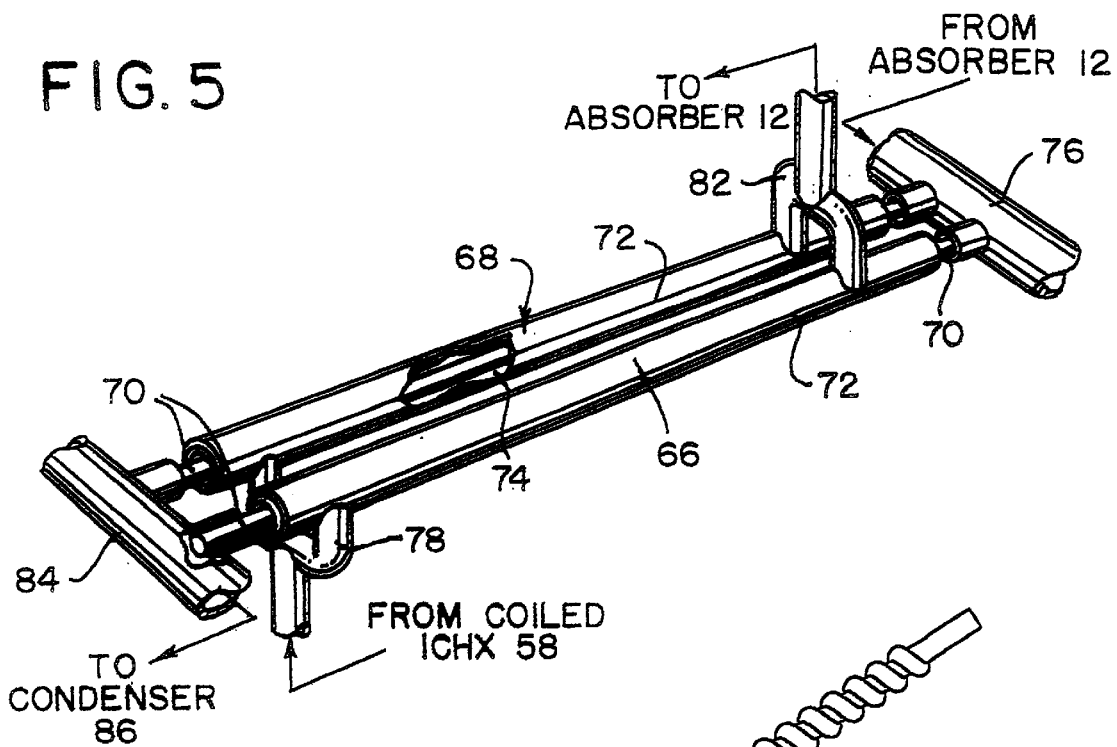
FIG. 5 is an isometric view of a split interchange heat exchanger.
Figure 5A:
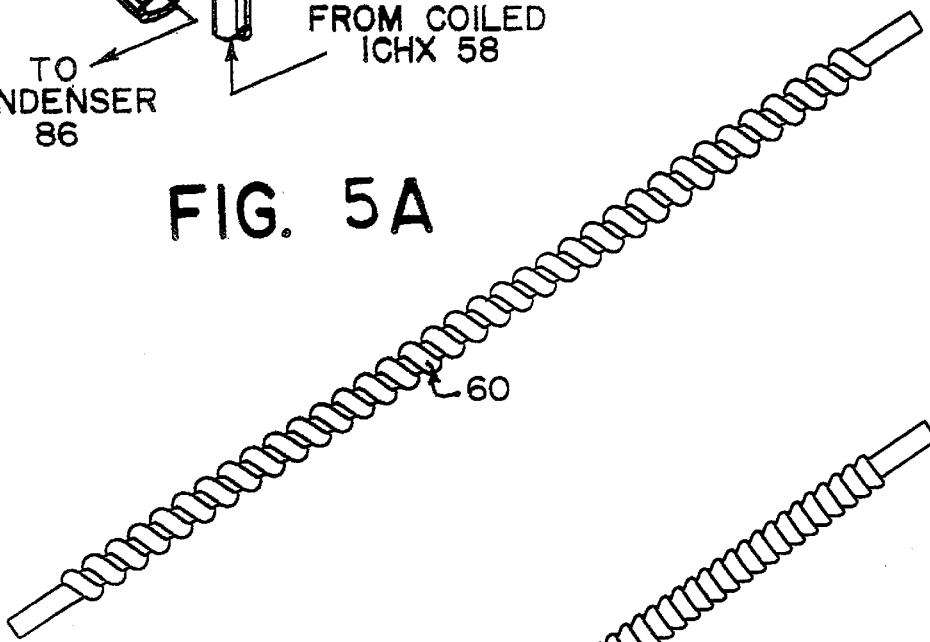
FIG. 5A is a plan view of an inner tube for an interchange heat exchanger having a convoluted profile.
Figure 5B:
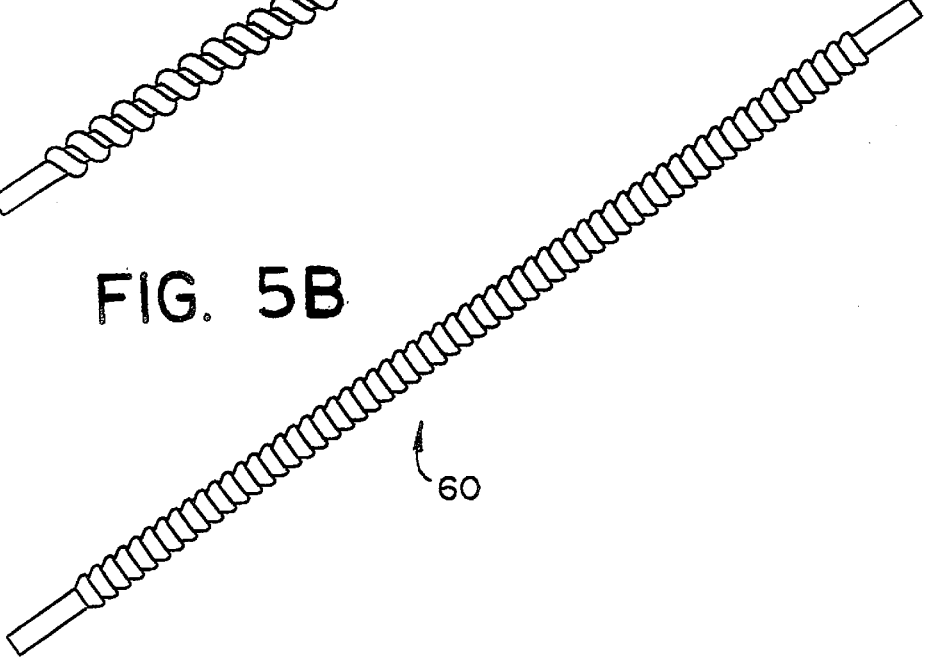
FIG. 5B is a plan view of an inner tube for an interchange heat exchanger having a corrugated profile.

Referring now to FIG. 5, there is depicted a split interchange heat exchanger 66, which includes a pair of tube assemblies 68. Each tube assembly 68 comprises an inner tube 70 concentrically disposed within an outer tube 72 to define an annulus 74 therebetween. The dilute liquid desiccant from desiccant absorber 12 is gravity fed to the interchange heat exchanger 66, where it is directed through a manifold 76 and into the inner tubes 70. Concentrated liquid desiccant from boiler 34 is first delivered through coiled interchange heat exchanger 58 and thereafter directed through a U-fitting 78 coupled to the respective outer tubes 72 and into the annuli 74. Alternatively, dilute liquid desiccant is passed through annuli 74 and concentrated liquid desiccant is passed through inner tubes 70. In this manner, heat is transferred from the concentrated liquid desiccant to the dilute liquid desiccant within split interchange heat exchanger 66. The concentrated liquid desiccant is thereafter drawn into a pump 80 (see FIGS. 1 and 1A) through a U-fitting 82 coupled to the respective outer tubes 72. The pump 80 delivers the concentrated liquid desiccant to distributor 14 of absorber 12. The partially heated dilute liquid desiccant flows through a manifold 84 to the condenser. During this stage, the dilute liquid desiccant dispensed from absorber 12 is raised to a first temperature. As discussed above with respect to coiled interchange heat exchanger 58, the inner tubes 70 may be fabricated from TEFLON and the outer tubes 72 may be constructed from silicone rubber. Likewise, the inner tubes may be provided with a convoluted or corrugated profile as shown in FIGS. 5A and 5B, respectively.

Figure 6:
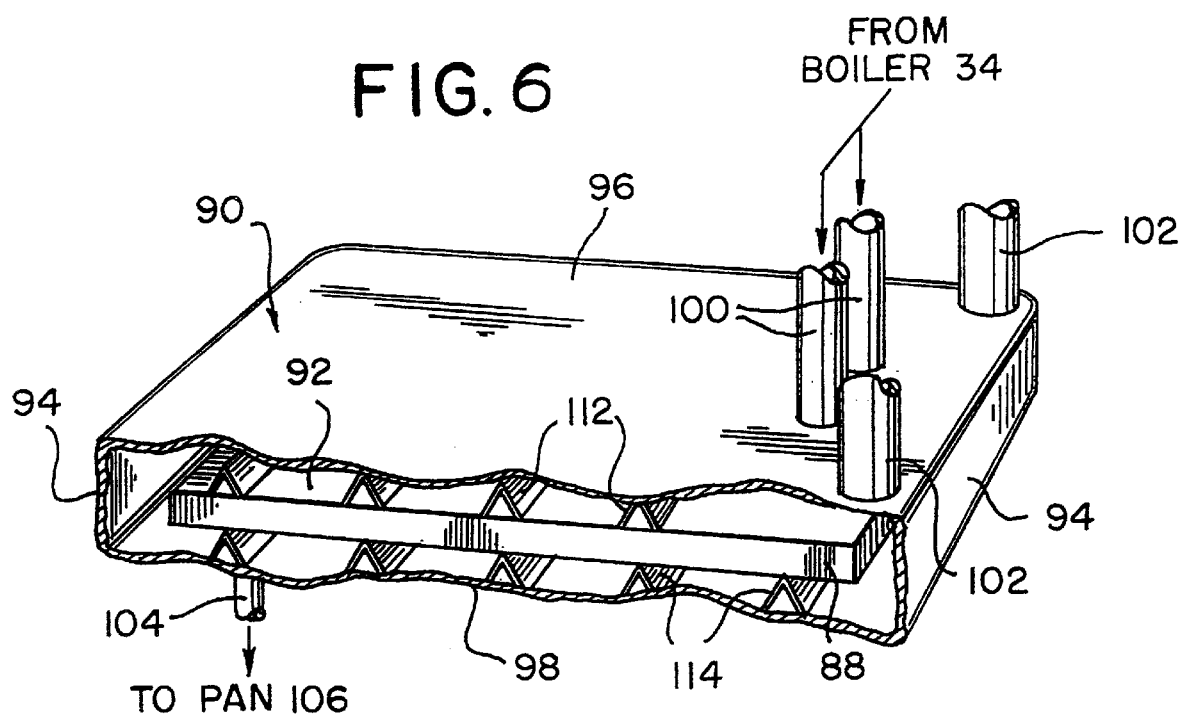
FIG. 6 is an isometric cut-away view of a condenser in a first embodiment.
Figure 7:
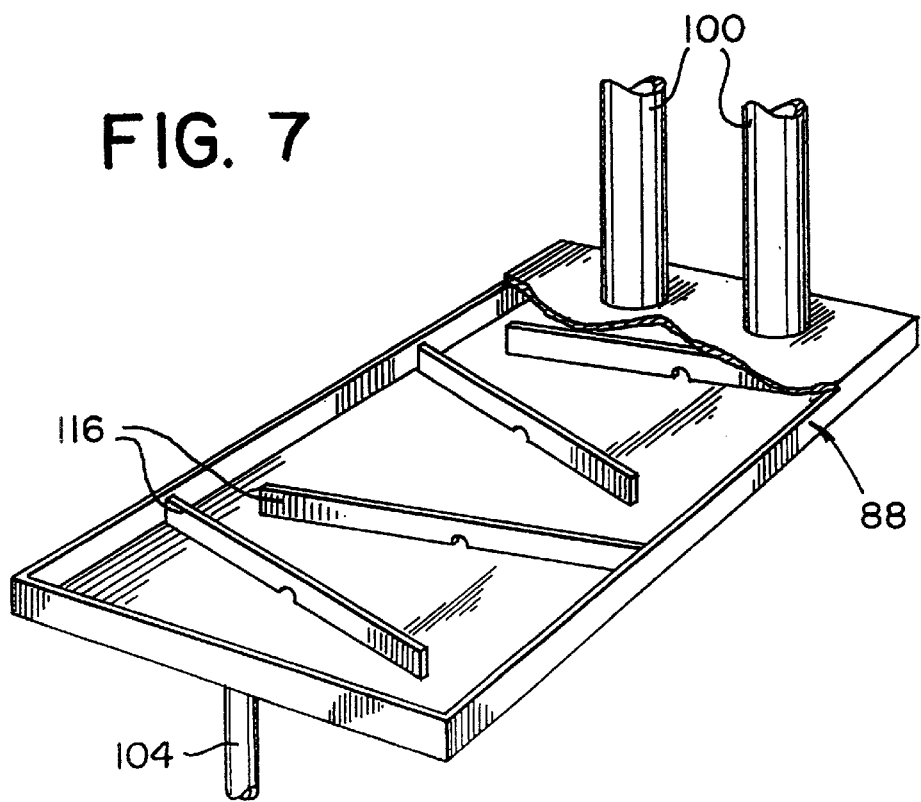
FIG. 7 is an isometric cut-away view of an inner shell of the condenser shown in FIG. 6.

The partially heated liquid desiccant at the first temperature is delivered to a condenser 86 from split interchange heat exchanger 66 as shown in FIGS. 1 and 1A. Referring now to FIGS. 6 and 7, there is depicted a first embodiment of condenser 86, which is comprised of an inner shell 88 disposed within an outer housing 90 defining at least one chamber 92 between inner shell 88 and housing 90. The housing 90 includes a plurality of side walls 94, a top wall 96 and a bottom wall 98. A pair of steam tubes 100 communicate with inner shell 88 through top wall 96 to deliver steam from boiler 34. A pair of air vents 102 likewise communicate with chamber 92 through top wall 96 to evacuate excess air therefrom. A condensate tube 104 communicates with inner shell 88 through bottom wall 98 to drain condensate into a condensate pan 106 (see FIG. 1A). An inlet tube 108 communicates with chamber 92 through one of the side walls 94 to deliver partially heated dilute desiccant to condenser 86 from split interchange heat exchanger 66. An outlet tube 110 is similarly disposed to communicate with chamber 92 on an opposite side of condenser 86 to deliver dilute desiccant which is sensibly heated to a second temperature by the latent heat of condensation as the steam condenses in the inner shell 88, to the coiled interchange heat exchanger 58 via the inlet port 54 of U-fitting 52 shown in FIGS. 1 and 4. To facilitate heat transfer, inner shell 88 is fabricated from materials including inconel, monel, titanium, TEFLON, TEFLON-coated copper, TEFLON-coated aluminum, and TEFLON-coated stainless steel. The housing 90 is fabricated from materials including TEFLON, polycarbonate, polyvinylidene fluoride, polypropylene, silicone rubber, polyethylene, and polystyrene. If a plastic such as TEFLON is used for the housing 90, the wall thickness is made suitably thick to provide the necessary insulating properties.

The condenser 86 may incorporate a plurality of fins 112 located on the exterior of inner shell 88 and a plurality of fins 114 disposed on bottom wall 98 of housing 90. The inner shell 88 may be provided with a plurality of baffles 116 to prevent short circuiting from steam inlets 100 to condensate outlet 104.

Figure 8:
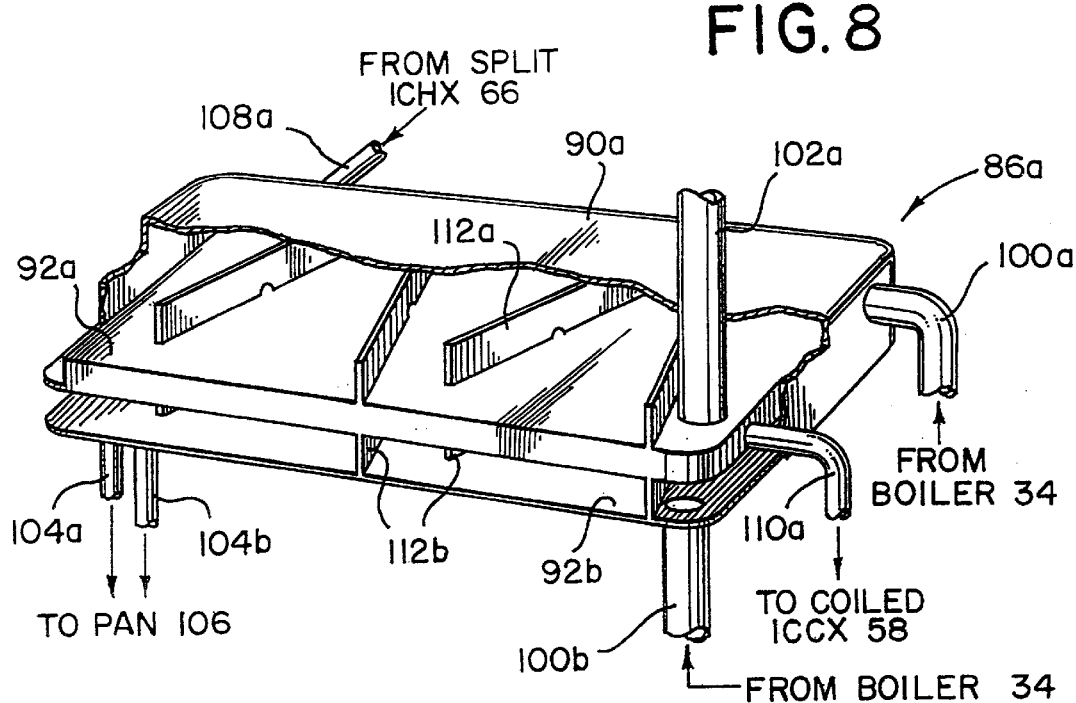
FIG. 8 is an isometric cut-away view of a condenser in a second embodiment.

Although depicted with the steam being directed into the inner shell 88 and the liquid desiccant being directed into the chamber 92, the opposite arrangement may be employed with the liquid desiccant directed into the inner shell 88 and the steam delivered to the chamber 92. Referring now to FIG. 8, there is shown an alternative embodiment of a condenser 86*a*, including a housing 90*a* and inner shell 88*a*, where the inner shell 88*a* segregates housing 90*a* into two compartments 92*a*, 92*b*, respectively. A steam inlet tube 100*a* communicates with compartment 92*a*, and a steam inlet tube 100*b* communicates with compartment 92*b*. Partially heated dilute dessicant solution is delivered to inner shell 88*a* through solution inlet 108*a*, and is sensibly heated by the latent heat of condensation as the steam condenses in the respective chambers 92*a*, 92*b*. Condensate flows out of chambers 92*a*, 92*b*, via condensate outlets 104*a*, 104*b*, respectively. Partially heated dilute dessicant at the second temperature flows out of inner shell 88*a* through solution outlet 110*a* to coiled interchange heat exchanger 58. Baffles 112*a*, 112*b* are provided in chambers 92*a*, 92*b*, respectively.

Figure 9:
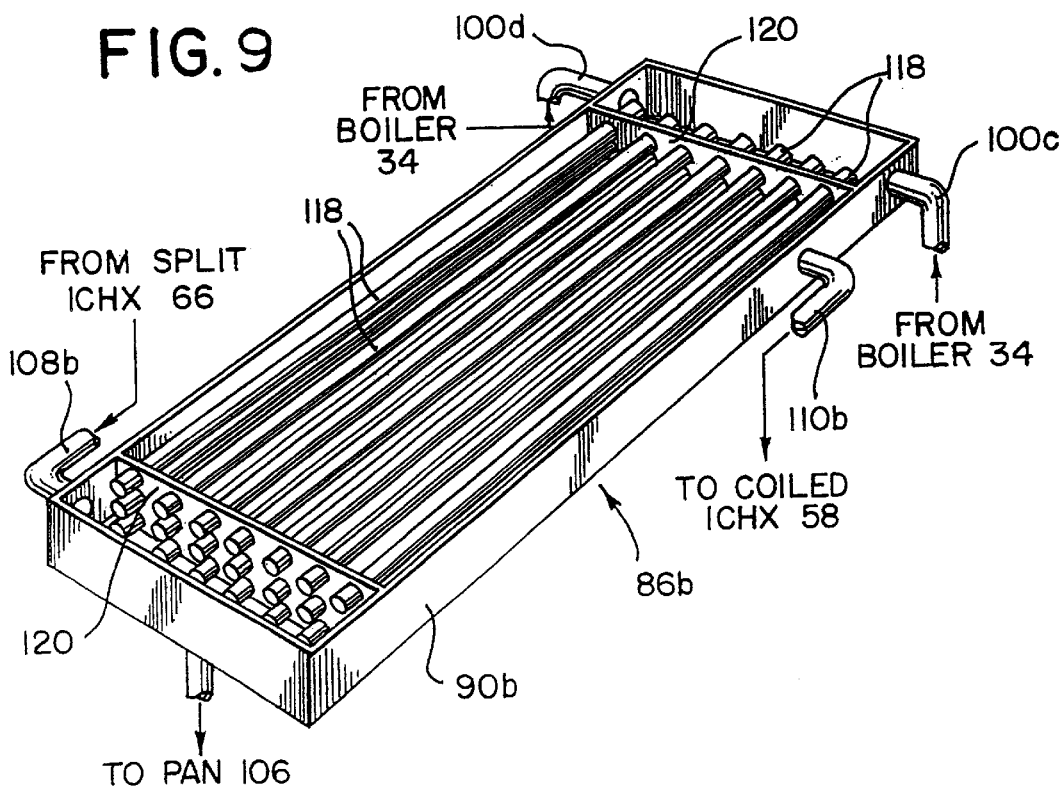
FIG. 9 is an isometric cut-away view of a condenser in a third embodiment.

Referring now to FIG. 9, there is shown a third embodiment of a condenser 86*b*, comprising a housing 90*b* and a plurality of tubes 118, which may be convoluted or corrugated as described above with regard to the interchange heat exchangers and shown in FIGS. 5A and 5B. The tubes 118 are supported by opposing support plates 120 and communicate with respective steam inlets 100*c*, 100*d* through which steam is delivered from boiler 34. The housing 90*b* includes a liquid dessicant solution inlet 108*b* to receive dilute liquid desiccant from split interchange heat exchanger 66, and an outlet 110*b* to deliver partially heated liquid dessicant at the second temperature to the coiled interchange heat exchanger 58. The tubes 118 are fabricated from Teflon, and the support plates 120 include at least one silicone rubber sheet attached thereto.

Figure 11:
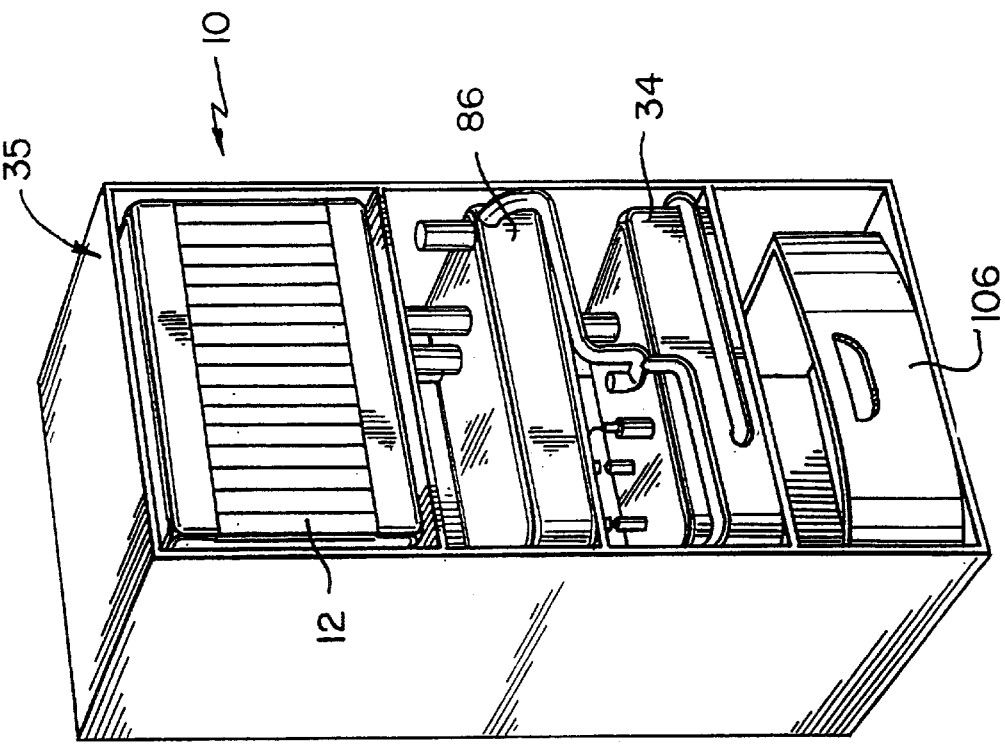
FIG. 11 is an isometric cut-away view depicting the frame and some of the components installed therein.

Referring now to FIG. 11, the respective components of the PLDD 10 are shown stacked within frame 35.

During the operating cycle, ambient air is drawn into the unit, through absorber 12 and exhausted to the room by fan 23. The moisture in the air is extracted as the air makes contact with the liquid dessicant wicking accross the micro-glass fiber wick plates 20, 22. Dilute liquid dessicant is gravity fed from drain pan 24 of absorber 12 to manifold 76 of split interchange heat exchanger 66, wherein it is raised to a first temperature through heat transfer from concentrated liquid dessicant flowing through annuli 74. The dilute liquid desiccant at the first temperature is then delivered to the condenser 86, in which the latent heat of condensation from condensing steam sensibly heats the liquid desiccant to the second temperature without exposing the desiccant to steam. The liquid dessicant at the second temperature is thereafter delivered to the coiled interchange heat exchanger 58 in which it is further heated to a third temperature prior to introduction into boiler 34 for regeneration. The coiled interchange heat exchanger 58 recovers waste heat radiating from the walls 36 of boiler 34. The concentrated liquid desiccant solution produced by boiling the liquid desiccant is drawn through the coiled interchange heat exchanger 58 and split interchange heat exchanger 66, and thereafter delivered to distributor 14 of absorber 12 by pump 80. The stacking of the respective components as shown in FIG. 1 provides for the gravity feed of dilute liquid desiccant from absorber 12 to boiler 34 through the first and second heat exchangers and the condenser, thereby eliminating the need for multiple pumps in the system.

The present invention has been shown and described in what are considered to be the most practical and preferred embodiments. It is anticipated, however, that departures can be made therefrom and that obvious modifications will be implemented by persons skilled in the art.

What is claimed is:

1. A liquid desiccant dehumidifier for absorbing moisture contained in ambient air, said dehumidifier comprising, in combination:

a liquid desiccant absorber adapted to enable passage of ambient air through said desiccant absorber and being operative to receive concentrated liquid desiccant so as to absorb moisture contained in the ambient air and dispense dilute liquid desiccant;

a boiler operatively associated with said absorber to receive and boil dilute liquid desiccant to remove moisture in the form of steam from said liquid desiccant to reconstitute the dilute liquid desiccant into concentrated liquid desiccant; and a condenser communicating with said boiler and said absorber so as to receive steam from said boiler and receive dilute liquid desiccant from said absorber, said condenser being operative to recover latent heat of condensation from said steam so as to sensibly heat said dilute liquid desiccant prior to entry into said boiler without directly exposing said dilute liquid desiccant to air.

2. The liquid desiccant dehumidifier as defined in claim 1, further including a heat exchanger fluidly communicating with said desiccant absorber, said condenser and said boiler so as to receive concentrated liquid desiccant from said boiler and dilute liquid desiccant from said desiccant absorber, said heat exchanger being operative to transfer heat from said concentrated liquid desiccant to said dilute liquid desiccant and deliver preheated dilute liquid desiccant to said condenser.

3. The liquid desiccant dehumidifier recited in claim 2, wherein said heat exchanger comprises at least one tube assembly including an inner tube concentrically disposed within an outer tube to define an annulus therebetween.

4. The liquid desiccant dehumidifier recited in claim 3, wherein dilute liquid desiccant from said desiccant absorber is passed through said inner tube, and concentrated liquid desiccant is passed through said annulus.

5. The liquid desiccant dehumidifier recited in claim 3, wherein dilute liquid desiccant from said desiccant absorber is passed through said annulus, and concentrated liquid desiccant is passed through said inner tube.

6. The liquid desiccant dehumidifier recited in claim 3, wherein said inner tube is fabricated from polytetrafluoroethyline, and said outer tube is fabricated from silicone rubber.

7. The liquid desiccant dehumidifier recited in claim 2, wherein said heat exchanger comprises at least one tube assembly including an inner tube fabricated from polytetrafluoroethyline concentrically disposed within an outer tube fabricated from silicone rubber to define an annulus therebetween.

8. A liquid desiccant dehumidifier as defined in claim 1, further including a heat exchanger fluidly communicating with said condenser, said boiler and said desiccant absorber so as to receive concentrated liquid desiccant from said boiler and heated dilute liquid desiccant from said condenser, said heat exchanger being operative to transfer heat from said concentrated liquid desiccant to said heated dilute liquid desiccant to further preheat the dilute liquid desiccant prior to delivery to said boiler, said heat exchanger being disposed with respect to said boiler to recover waste heat from said boiler.

9. The liquid desiccant dehumidifier recited in claim 8, wherein said heat exchanger comprises at least one tube assembly including an inner tube fabricated from polytetrafluoroethyline concentrically disposed within an outer tube fabricated from silicone rubber to define an annulus therebetween.

10. A liquid desiccant dehumidifier as defined in claim 1, wherein said desiccant absorber has a top and a bottom and includes a plurality of horizontally and vertically disposed plates between said top and bottom, said plates being capable of wetting by desiccant, a distributor disposed above said plates for introducing concentrated desiccant into said desiccant absorber, and a drain pan for collecting dilute desiccant at said bottom of said desiccant absorber.

11. A liquid desiccant dehumidifier as defined in claim 10 wherein said plates comprise microglass fiber plates.

12. The liquid desiccant dehumidifier recited in claim 1, wherein said condenser comprises an inner shell disposed within an outer housing defining at least one chamber between said inner shell and said housing.

13. The liquid desiccant dehumidifier recited in claim 12, wherein said inner shell is fabricated from materials selected from the group including inconel, monel, titanium, polytetrafluoroethyline, polytetrafluoroethyline-coated copper, polytetrafluoroethyline-coated aluminum, and polytetrafluoroethyline-coated stainless steel; and said outer shell is fabricated from materials selected from the group of polytetrafluoroethyline, polycarbonate, polyvinylidene fluoride, polypropylene, silicone rubber, polyethylene, and polystyrene.

14. The liquid desiccant dehumidifier recited in claim 12, wherein said condenser further comprises at least one steam inlet communicating steam from said boiler with said at least one chamber and at least one solution inlet communicating dilute liquid desiccant with said inner shell.

15. The liquid desiccant dehumidifier recited in claim 12, wherein said condenser further comprises at least one steam inlet communicating steam from said boiler with said inner shell and at least one solution inlet communicating dilute liquid desiccant with said at least one chamber.

16. The liquid desiccant dehumidifier recited in claim 12, wherein said inner shell divides said housing into two separate compartments, each compartment having a steam inlet and a condensate outlet, said housing further comprising a plurality of baffles to prevent short circiuting from said steam inlets to said condensate outlets.

17. The liquid desiccant dehumidifier recited in claim 1, wherein said condenser comprises a housing and a plurality of tubes, said tubes being supported by opposing support plates, said tubes communicating with a steam inlet to receive steam from said boiler, said housing including a solution inlet to receive dilute liquid desiccant.

18. The liquid desiccant dehumidifier as defined in claim 17 wherein said tubes comprise convoluted or corrugated tubes.

19. The liquid desiccant dehumidifier recited in claim 17, wherein said tubes are fabricated from polytetrafluoroethyline, and said support plates have at least one silicone rubber sheet attached thereto.

20. The liquid desiccant dehumidifier recited in claim 1, further comprising a frame fabricated from materials selected from the group of polypropylene, polyethylene, polytetrafluoroethyline, polyvinylidene fluoride, polycarbonate, PVC and polystyrene.

21. The liquid desiccant dehumidifier recited in claim 1, wherein said liquid desiccant is selected from the group including aqueous LiCl, LiBr and $CaCl_2$.

22. The liquid desiccant dehumidifier as defined in claim 21 wherein said liquid desiccant comprises a mixture of at least two of the group including aqueous LiCl, LiBr and $CaCl_2$.

23. The liquid desiccant dehumidifier recited in claim 1, wherein said boiler includes a vessel fabricated from plastic.

24. The liquid desiccant dehumidifier recited in claim 23, wherein said plastic is selected from the group of including polytetrafluoroethyline, polycarbonate, and polyvinylidene fluoride.

25. The liquid desiccant dehumidifier recited in claim 1, further comprising means for pumping concentrated liquid desiccant into said desiccant absorber.

26. A liquid desiccant dehumidifier comprising, in combination:

a liquid desiccant absorber for absorbing moisture contained in ambient air passing through said desiccant absorber, said desiccant absorber being adapted to receive concentrated liquid desiccant and dispense dilute liquid desiccant;

a boiler for boiling dilute liquid desiccant to generate steam by evaporating moisture from the liquid desiccant and reconstituting it into concentrated liquid desiccant;

a condenser communicating with said boiler and said absorber so as to receive steam generated by said boiler and receive dilute liquid desiccant from said absorber, said condenser being operable to sensibly heat the dilute liquid desiccant therein by recovering the latent heat of condensation as steam received from said boiler is condensed to thereby heat said dilute liquid desiccant prior to delivery to said boiler; and a heat exchanger communicating with said condenser, said boiler and said absorber, said heat exchanger being operable to transfer heat from concentrated liquid desiccant directed to said heat exchanger from said boiler to the heated dilute liquid desiccant directed to said heat exchanger from said condenser to further heat the dilute liquid desiccant prior to delivery to said boiler, said heat exchanger comprising at least one tube assembly including an inner tube concentrically disposed within an outer tube to define an annulus therebetween, said at least one tube assembly being coiled around said boiler to recover waste heat from said boiler.

27. The liquid desiccant dehumidifier recited in claim 26, wherein dilute liquid desiccant from said condenser is passed through said inner tube, and concentrated liquid desiccant from said boiler is passed through said annulus.

28. The liquid desiccant dehumidifier recited in claim 26, wherein dilute liquid desiccant from said condenser is passed through said annulus, and concentrated liquid desiccant from said boiler is passed through said inner tube.

29. The liquid desiccant dehumidifier recited in claim 26, wherein said inner tube is fabricated from Teflon, and said outer tube is fabricated from silicone rubber.

30. A liquid desiccant dehumidifier comprising, in combination:

a liquid desiccant absorber for absorbing moisture contained in ambient air passing through said desiccant absorber, said desiccant absorber being operative to receive concentrated liquid desiccant and dispense dilute liquid desiccant, a boiler for receiving and boiling dilute liquid desiccant to evaporate moisture and generate steam therefrom so as to reconstitute the liquid desiccant into concentrated liquid desiccant;

a first heat exchanger adapted to receive dilute liquid desiccant from said desiccant absorber and transfer heat to said dilute liquid desiccant from concentrated liquid desiccant so as to raise the temperature of the dilute liquid desiccant to a first temperature;

a condenser communicating with said boiler and said first heat exchanger so as to receive steam generated by said boiler and dilute liquid desiccant from said first heat exchanger at substantially said first temperature, said condenser being operative to sensibly heat the dilute liquid desiccant therein to a second temperature by subjecting said dilute liquid desiccant to latent heat resulting from condensation of steam received from said boiler without directly exposing said dilute liquid desiccant to air, a second heat exchanger communicating with said condenser, said boiler and said first heat exchanger, said second heat exchanger being operative to receive concentrated liquid desiccant from said boiler and transfer heat to dilute liquid desiccant received from said condenser so as to raise the temperature of the dilute liquid desiccant to a third temperature, said dilute liquid desiccant at the third temperature being directed to said boiler, and said concentrated liquid desiccant from said boiler being directed to said first heat exchanger, said second heat exchanger being disposed with respect to said boiler to recover waste heat from said boiler; and means for pumping concentrated liquid desiccant into said absorber.

31. The liquid desiccant dehumidifier recited in claim 30, wherein said desiccant absorber includes a top and a bottom and comprises: a plurality of horizontally and vertically disposed interconnected microglass fiber plates; a distributor disposed above said fiber plates at said top of said desiccant absorber for introducing the concentrated desiccant into said desiccant absorber; and a drain pan for collecting the dilute desiccant disposed at said bottom of said desiccant absorber.

32. The liquid desiccant dehumidifier recited in claim 30, wherein said first heat exchanger comprises at least one tube assembly including an inner tube concentrically disposed within an outer tube to define an annulus therebetween.

33. The liquid desiccant dehumidifier recited in claim 32, wherein dilute liquid desiccant from said desiccant absorber is passed through said inner tube, and said concentrated liquid desiccant is passed through said annulus.

34. The liquid desiccant dehumidifier recited in claim 32, wherein dilute liquid desiccant from said desiccant absorber is passed through said annulus, and concentrated liquid desiccant is passed through said inner tube.

35. The liquid desiccant dehumidifier recited in claim 32, wherein said inner tube is fabricated from polytetrafluoroethyline, and said outer tube is fabricated from silicone rubber.

36. The liquid desiccant dehumidifier recited in claim 30, wherein said second heat exchanger comprises at least one tube assembly including an inner tube concentrically disposed within an outer tube to define an annulus therebetween, said at least one tube assembly being coiled around said boiler to recover said waste heat.

37. The liquid desiccant dehumidifier recited in claim 36, wherein dilute liquid desiccant from said condenser is passed through said inner tube and concentrated liquid desiccant from said boiler is passed through said annulus.

38. The liquid desiccant dehumidifier recited in claim 36, wherein dilute liquid desiccant from said condenser is passed through said annulus and concentrated liquid desiccant from said boiler is passed through said inner tube.

39. The liquid desiccant dehumidifier recited in claim 30, wherein said condenser comprises an inner shell disposed within an outer housing defining at least one chamber between said inner shell and said housing.

40. The liquid desiccant dehumidifier recited in claim 39, wherein said inner shell is fabricated from materials selected from the group including inconel, monel, titanium, polytetrafluoroethyline, polytetrafluoroethyline-coated copper, polytetrafluoroethyline-coated aluminum, and Teflon-coated stainless steel; and said outer shell is fabricated from materials selected from the group of Teflon, polycarbonate, polyvinylidene fluoride, polypropylene, silicone rubber, polyethylene, and polystyrene.

41. The liquid desiccant dehumidifier recited in claim 39, wherein said condenser further comprises at least one steam inlet communicating steam from said boiler with said at least one chamber and at least one solution inlet communicating heated dilute liquid desiccant from said first heat exchanger with said inner shell.

42. The liquid desiccant dehumidifier recited in claim 39, wherein said condenser further comprises at least one steam inlet communicating steam from said boiler with said inner shell and at least one solution inlet communicating heated dilute liquid desiccant from said first heat exchanger with said at least one chamber.

43. The liquid desiccant dehumidifier recited in claim 39, wherein said inner shell divides said housing into two separate compartments, each compartment having a steam inlet and a condensate outlet, said housing further comprising a plurality of baffles to prevent short circuiting from said steam inlets to said condensate outlets.

44. The liquid desiccant dehumidifier recited in claim 30, wherein said condenser comprises a housing and a plurality of tubes, said tubes being supported by opposing support plates, said tubes communicating with a steam inlet to receive steam from said boiler, said housing including a solution inlet to receive dilute liquid desiccant from said first heat exchanger.

45. The liquid desiccant dehumidifier recited in claim 44, wherein said tubes comprise convoluted or corrugated tubes.

46. The liquid desiccant dehumidifier recited in claim 44, wherein said tubes are fabricated from polytetrafluoroethyline, and said support plates have at least one silicone rubber sheet attached thereto.

47. The liquid desiccant dehumidifier recited in claim 30, further comprising a frame fabricated from materials selected from the group including polypropylene, polyethylene, polytetrafluoroethyline, polyvinylidene fluoride, polycarbonate, PVC and polystyrene.

48. The liquid desiccant dehumidifier recited in claim 30, wherein said liquid desiccant is selected from the group including aqueous LiCl, LiBr and $CaCl_2$.

49. The liquid desiccant dehumidifier recited in claim 48, wherein said liquid desiccant is a mixture of at least two of aqueous LiCl, LiBr and $CaCl_2$.

50. The liquid desiccant dehumidifier recited in claim 30, wherein said boiler includes a vessel fabricated from plastic.

51. The liquid desiccant dehumidifier recited in claim 50, wherein said plastic is selected from the group including polytetrafluoroethyline, polycarbonate, and polyvinylidene fluoride.

52. A liquid desiccant dehumidifier comprising, in combination:

a liquid desiccant absorber for absorbing moisture contained in ambient air entering the dehumidifier and passing through said desiccant absorber, said desiccant absorber being constructed and arranged for receiving concentrated liquid desiccant and dispensing dilute liquid desiccant, a boiler for boiling dilute liquid desiccant to evaporate moisture to reconstitute the liquid desiccant into concentrated liquid desiccant;

a first heat exchanger operable to transfer heat from concentrated liquid desiccant to dilute liquid desiccant directed to said first heat exchanger from said desiccant absorber so as to raise the temperature of the dilute liquid desiccant to a first temperature, said first heat exchanger being disposed below said desiccant absorber to enable dilute liquid desiccant from said absorber to be gravity fed to said first heat exchanger;

a condenser fluidly communicating with said boiler to receive steam generated by boiling liquid desiccant in said boiler, said condenser further fluidly communicating with said first heat exchanger to receive dilute liquid desiccant from said first heat exchanger at substantially said first temperature, said condenser being operable to sensibly heat the dilute liquid desiccant therein to a second temperature by recovering the latent heat of condensation as steam received from said boiler is condensed, said condenser being configured to sensibly heat said dilute liquid desiccant without directly exposing said liquid desiccant to air, said condenser being disposed below said first heat exchanger to enable dilute liquid desiccant from said first heat exchanger to be gravity fed to said condenser;

a second heat exchanger fluidly communicating with said condenser, said boiler and said first heat exchanger, said second heat exchanger being operable to transfer heat from concentrated liquid desiccant directed to said second heat exchanger from said boiler to the dilute liquid desiccant directed to said second heat exchanger from said condenser at said second temperature to raise the temperature of the dilute liquid desiccant to a third temperature, said dilute liquid desiccant at the third temperature being directed to said boiler, said second heat exchanger being disposed with respect to said boiler to recover waste heat from said boiler and being disposed below said condenser to enable dilute liquid desiccant from said condenser to be gravity fed to said second heat exchanger and to said boiler; and means for pumping concentrated liquid desiccant to said absorber.

53. An interchange heat exchanger, comprising:

at least one tube assembly including an inner flow tube fabricated solely from polytetrafluoroethyline concentrically disposed within an outer flow tube so as to define as annulus therebetween, said outer flow tube being fabricated from a heat insulating material selected from a group including silicon rubber, said inner and outer flow tubes being operative to facilitate heat transfer between a first liquid passed through said inner flow tube and a second liquid passed through said annulus.

54. A interchange heat exchanger as defined in claim 53 wherein said inner tube is formed as a circumferentially convoluted or corrugated tube to enhance heat transfer.

55. A method for absorbing moisture from ambient air, said method comprising the steps of;

passing the ambient air through a concentrated liquid desiccant so as to remove moisture from the ambient air and create dilute liquid desiccant, boiling the dilute liquid desiccant to remove moisture therefrom in the form of steam and reconstitute the dilute liquid desiccant into heated concentrated liquid desiccant, recovering latent heat of condensation from said steam and utilizing said heat to sensibly heat said dilute liquid desiccant prior to boiling said dilute liquid desiccant to remove moisture therefrom, said sensible heating being effected without directly exposing the dilute liquid desiccant to air.

56. The method as defined in claim 55 including the step of preheating said dilute liquid desiccant prior to said sensible heating thereof.

57. The method as defined in claim 56 wherein said step of preheating said dilute liquid desiccant includes transferring heat to said dilute liquid desiccant from said heated concentrated liquid desiccant.

58. The method as defined in claim 56 wherein said step of boiling said dilute liquid desiccant includes passing said dilute liquid desiccant into a boiler, and including the step of utilizing waste heat from said boiler to further preheat said dilute liquid desiccant prior to boiling thereof.

59. The method as defined in claim 55 including the step of transferring heat to the dilute liquid desiccant so as to further heat the dilute liquid desiccant after said step of sensibly heating said dilute liquid desiccant but prior to said step of boiling the dilute liquid desiccant.

60. The method as defined in claim 59 wherein said step of boiling said dilute liquid desiccant is carried out in a boiler, said step of transferring heat to the dilute liquid desiccant after said step of sensibly heating said dilute liquid desiccant including transferring heat to said dilute liquid desiccant from heated concentrated liquid desiccant as reconstituted in said boiler.

61. The method as defined in claim 60 wherein said step of transferring heat to the dilute liquid desiccant after said step of sensibly heating said dilute liquid desiccant further includes transferring heat to said dilute liquid desiccant from waste heat from said boiler.

62. A method for absorbing moisture contained in ambient air, said method comprising the steps of:

passing ambient air through a liquid desiccant absorber having concentrated liquid desiccant therein operative to absorb moisture contained in the ambient air so as to create dilute liquid desiccant;

passing the dilute liquid desiccant from the absorber to a boiler operative to boil the dilute liquid desiccant to remove moisture in the form of steam and reconstitute the dilute liquid desiccant into concentrated liquid desiccant;

passing steam from the boiler to a condenser;

passing dilute liquid desiccant from the absorber to said condenser prior to passage to said boiler, said condenser being operative to recover latent heat of condensation from said steam and sensibly heat the dilute liquid desiccant without directly exposing the dilute liquid desiccant to air; and passing said heated dilute liquid desiccant from the condenser to the boiler.

* * * * *